United States Patent
Wu

(10) Patent No.: US 10,137,955 B1
(45) Date of Patent: Nov. 27, 2018

(54) KICK SCOOTER WITH A STEERING ANGLE ADJUSTMENT MECHANISM

(71) Applicant: Anita Wu, Guangdong (CN)

(72) Inventor: Anita Wu, Guangdong (CN)

( * ) Notice: Subject to any disclaimer, the term of this patent is extended or adjusted under 35 U.S.C. 154(b) by 0 days.

(21) Appl. No.: 16/051,523

(22) Filed: Aug. 1, 2018

(51) Int. Cl.
   *B62D 61/02* (2006.01)
   *B62K 3/00* (2006.01)

(52) U.S. Cl.
   CPC .................. *B62K 3/002* (2013.01)

(58) Field of Classification Search
   CPC . B62K 15/00; B62K 3/00; B62M 1/00; B62D 61/02
   See application file for complete search history.

(56) References Cited

U.S. PATENT DOCUMENTS

| | | | | |
|---|---|---|---|---|
| 9,932,087 | B2* | 4/2018 | Alvarez-Icaza | B62M 29/00 |
| 2013/0277941 | A1* | 10/2013 | Ryan | B62K 15/006 |
| | | | | 280/278 |
| 2018/0029660 | A1* | 2/2018 | Petutschnig | A63C 17/0066 |

* cited by examiner

*Primary Examiner* — James A Shriver, II
*Assistant Examiner* — James J Triggs

(57) ABSTRACT

A kick scooter includes an interconnecting member at a bottom of a deck; two links pivotably attached to two ends of the interconnecting member respectively; two biasing members in the interconnecting member and each having one end urging against one link; and a steering angle adjustment mechanism including a positioning member secured to the interconnecting member, an internally threaded member secured to the deck, an adjustment screw secured to the internally threaded member, a first bifurcation member disposed through a compression spring, the first bifurcation member having one end secured to the positioning member and the other two hooked ends secured to one end of the compression spring, and a second bifurcation member disposed through the compression spring, the second bifurcation member having one end secured to an end of the adjustment screw and the other two hooked ends secured to the other end of the compression spring.

1 Claim, 4 Drawing Sheets

KICK SCOOTER WITH A STEERING ANGLE ADJUSTMENT MECHANISM

BACKGROUND OF THE INVENTION

1. Field of the Invention

The invention relates to kick scooters and more particularly to a three-wheeled kick scooter with a steering angle adjustment mechanism having improved characteristics.

2. Description of Related Art

A conventional kick scooter comprises a steering control mechanism which is either inactivated by pressing a push button or activated by pressing the push button again.

However, a steering angle adjustment is not provided. Thus, the steering is not smooth and the need for improvement still exists.

SUMMARY OF THE INVENTION

It is therefore one object of the invention to provide a kick scooter comprising a steering tube; a handlebar secured to a top of the steering tube; a deck having a front portion attached to a bottom of the steering tube; a rear wheel rotatably attached to a rear end of the deck; an interconnecting member disposed at a bottom of the front portion of the deck; two links pivotally attached to two ends of the interconnecting member respectively and pivotally secured to the front portion of the deck; two front wheels rotatably secured to the links respectively; two biasing members disposed in the interconnecting member and each having one end urging against one of the links; a steering angle adjustment mechanism disposed in the front portion of the deck; and a cap releasably secured to the bottom of the front portion of the deck for concealing the steering angle adjustment mechanism; wherein the steering angle adjustment mechanism comprises a positioning member secured to a center of the interconnecting member, an internally threaded member secured to the deck, an adjustment screw adjustably secured to the internally threaded member, a first bifurcation member disposed through a compression spring, the first bifurcation member having one end secured to the positioning member and the other two hooked ends secured to one end of the compression spring, and a second bifurcation member disposed through the compression spring, the second bifurcation member having one end secured to an end of the adjustment screw and the other two hooked ends secured to the other end of the compression spring.

The above and other objects, features and advantages of the invention will become apparent from the following detailed description taken with the accompanying drawings.

DETAILED DESCRIPTION OF THE INVENTION

Figure 1:
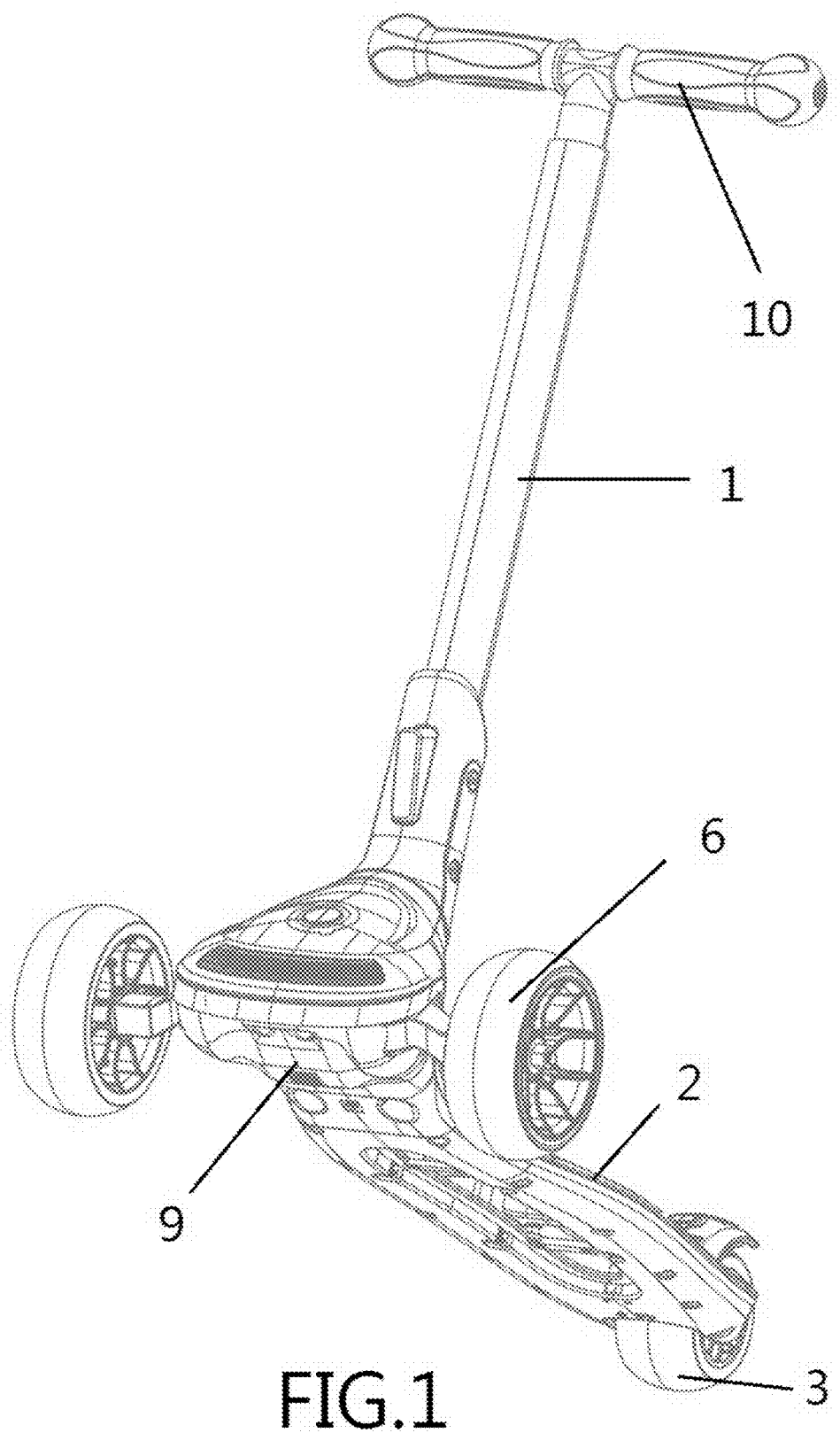
FIG. 1 is a perspective view of a kick scooter according to the invention.
Figure 2:
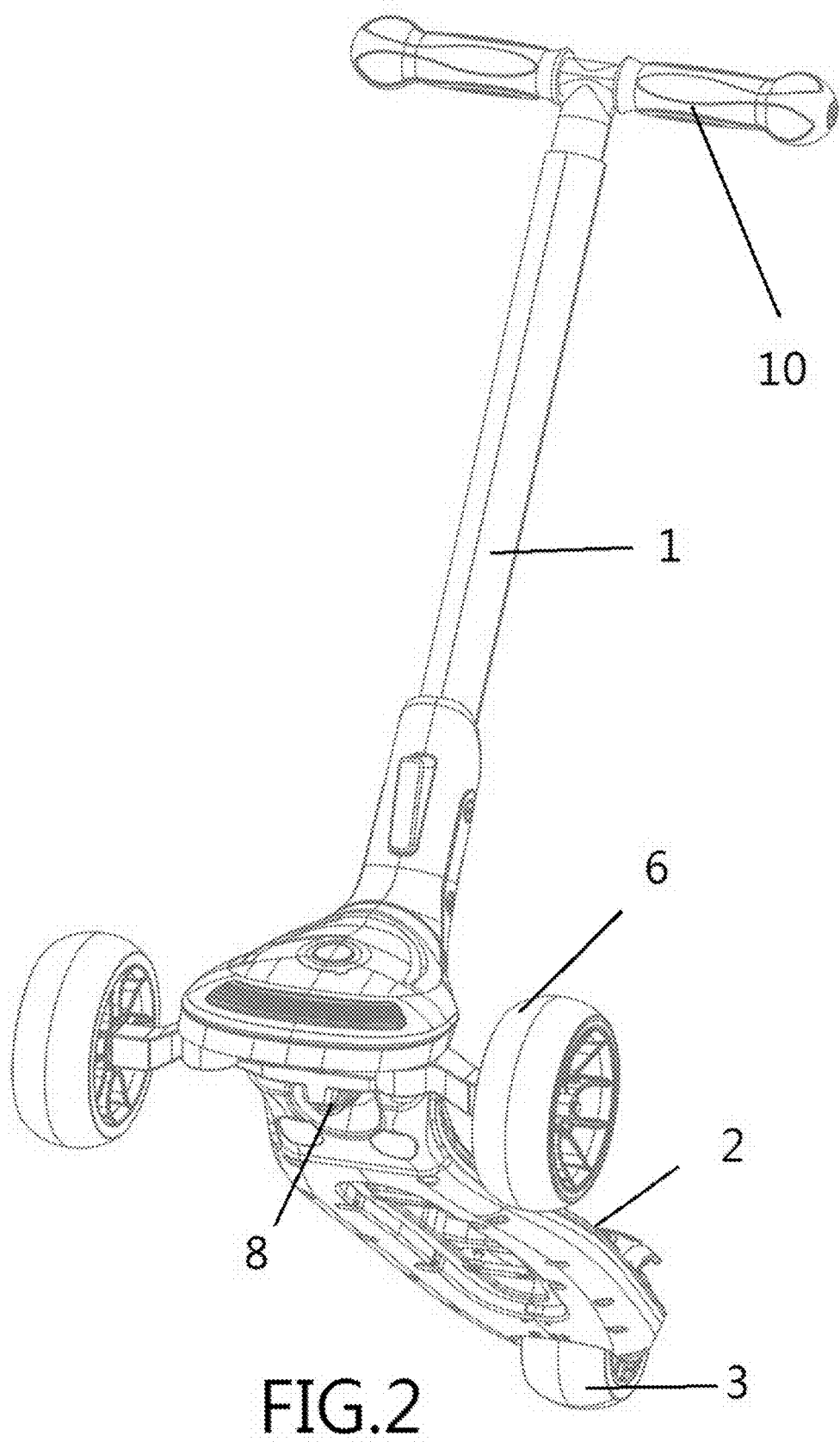
FIG. 2 is a view similar to FIG. 1 with the cap for a steering angle adjustment mechanism removed.
Figure 3:
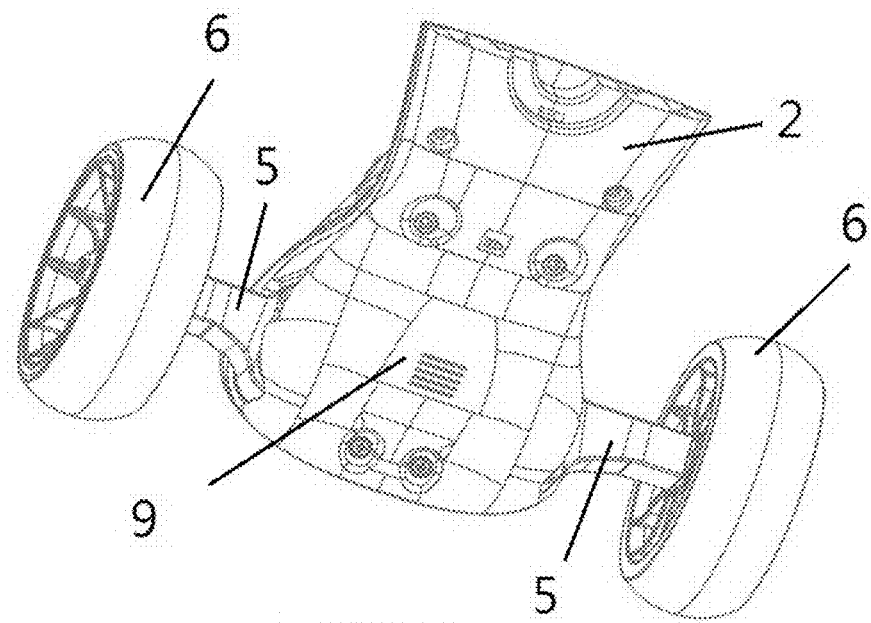
FIG. 3 is a fragmentary view of FIG. 1 showing the steering angle adjustment mechanism.
Figure 4:
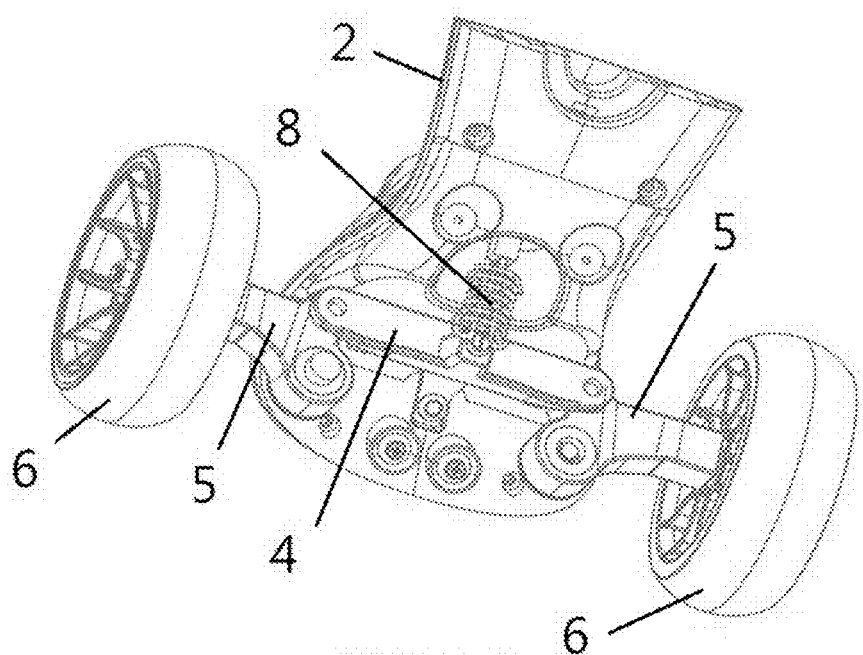
FIG. 4 is a fragmentary view of FIG. 2 showing the steering angle adjustment mechanism.
Figure 5:
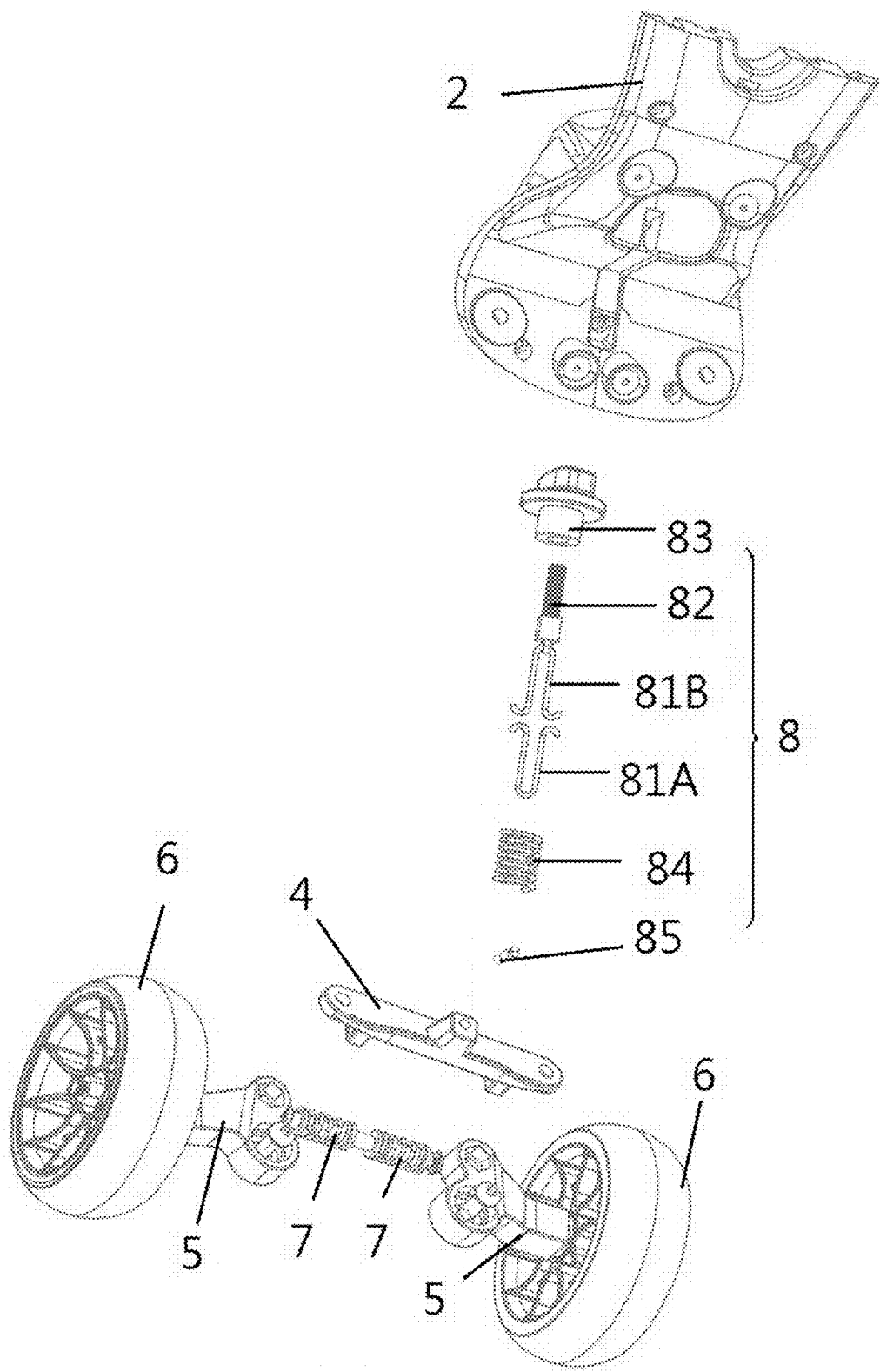
FIG. 5 is an exploded view of the steering angle adjustment mechanism of the FIG. 4.

Referring to FIGS. 1 to 5, a kick scooter in accordance with the invention comprises the following components as discussed in detail below.

A steering tube 1, a deck 2 having a front portion attached to a bottom of the steering tube 1, a rear wheel 3 rotatably attached to a rear end of the deck 2, an interconnecting member 4 disposed at a bottom of the front portion of the deck 2, two links 5 pivotably attached to two ends of the interconnecting member 4 respectively and pivotably secured to the front portion of the deck 2, two front wheels 6 rotatably secured to the links 5 respectively, two spaced compression springs 7 disposed in the interconnecting member 4 and each having one end urging against the link 5, a steering angle adjustment mechanism 8 disposed in a front portion of the deck 2, a cap 9 releasably secured to the bottom of the deck 2 for concealing the steering angle adjustment mechanism 8, and a handlebar 10 secured to a top of the steering tube 1.

The steering angle adjustment mechanism 8 as the subject of the invention is discussed in detail below. The steering angle adjustment mechanism 8 comprises a positioning member 85 secured to a center of the interconnecting member 4, an internally threaded member 83 secured to the deck 2, an adjustment screw 82 adjustably secured to the internally threaded member 83, a compression spring 84, a first bifurcation member 81A disposed through the compression spring 84, the first bifurcation member 81A having one end secured to the positioning member 85 and the other two hooked ends secured to one end of the compression spring 84, and a second bifurcation member 81B disposed through the compression spring 84, the second bifurcation member 81B having one end secured to an end of the adjustment screw 82 and the other two hooked ends secured to the other end of the compression spring 84.

An individual may use one hand to clockwise rotate the adjustment screw 82. And in turn, the second bifurcation member 81B is pulled toward a rear end of the deck 2. Thus, the compression spring 84 is compressed. As a result, a steering angle of the steering tube 1 is decreased.

To the contrary, the user may use one hand to counterclockwise rotate the adjustment screw 82. And in turn, the second bifurcation member 81B is pulled toward a front end of the deck 2. Thus, the compression spring 84 is expanded. As a result, the steering angle of the steering tube 1 is decreased.

It is envisaged by the invention that not only a steering angle adjustment is provided but also the steering is smooth.

While the invention has been described in terms of preferred embodiments, those skilled in the art will recognize that the invention can be practiced with modifications within the spirit and scope of the appended claims.

What is claimed is:

1. A kick scooter, comprising:
   a steering tube;
   a handlebar secured to a top of the steering tube;
   a deck having a front portion attached to a bottom of the steering tube;
   a rear wheel rotatably attached to a rear end of the deck;
   an interconnecting member disposed at a bottom of the front portion of the deck;
   two links pivotably attached to two ends of the interconnecting member respectively and pivotably secured to the front portion of the deck;
   two front wheels rotatably secured to the links respectively;
   two biasing members disposed in the interconnecting member and each having one end urging against one of the links;
   a steering angle adjustment mechanism disposed in the front portion of the deck; and a cap releasably secured to the bottom of the front portion of the deck for concealing the steering angle adjustment mechanism;

wherein the steering angle adjustment mechanism comprises a positioning member secured to a center of the interconnecting member, an internally threaded member secured to the deck, an adjustment screw adjustably secured to the internally threaded member, a first bifurcation member disposed through a compression spring, the first bifurcation member having one end secured to the positioning member and the other two hooked ends secured to one end of the compression spring, and a second bifurcation member disposed through the compression spring, the second bifurcation member having one end secured to an end of the adjustment screw and the other two hooked ends secured to the other end of the compression spring.

\* \* \* \* \*